United States Patent [19]

Graves

[11] Patent Number: 4,524,052

[45] Date of Patent: Jun. 18, 1985

[54] BORATE CHLORIDE POLYMERIZATION CATALYSTS

[75] Inventor: Daniel F. Graves, Clinton, Ohio

[73] Assignee: The Firestone Tire & Rubber Company, Akron, Ohio

[21] Appl. No.: 685,582

[22] Filed: Dec. 24, 1984

[51] Int. Cl.$^3$ .................. C01B 33/20; C01B 25/10
[52] U.S. Cl. .................. 423/277; 423/299; 423/300; 423/301; 423/302; 423/304; 423/351; 423/385; 423/386
[58] Field of Search .............. 423/277, 300, 301, 302, 423/304, 351, 385, 386, 299

[56] References Cited

U.S. PATENT DOCUMENTS 4,226,840 10/1980 Fieldhouse et al. ............ 423/300
4,377,558 3/1983 De Jaeger et al. ............ 423/300

Primary Examiner—Gary P. Straub
Assistant Examiner—Jackson Leeds
Attorney, Agent, or Firm—Frank J. Troy, Sr.

[57] ABSTRACT

New compositions of matter which are halogenated derivatives of borates are disclosed which are catalytically active in the polymerization of halogenated phosphazene trimers and other oligomers are disclosed.

8 Claims, No Drawings

BORATE CHLORIDE POLYMERIZATION CATALYSTS

BACKGROUND OF THE INVENTION

1. Field of the Invention

The present invention relates to novel borate compounds and their use as polymerization catalysts which are particularly effective for the polymerization of polyphosphazene synthetic rubbers.

2. Description of the Prior Art

Phosphazenes are compounds of the general formula $A_3P=NB$, wherein A and B may be organic radicals, hydroxyl, halides, or pseudohalides. Oligomers of phosphazenes may be linear or cyclic. At temperatures above 250° C., the cyclic chlorophosphazenes polymerize to form long chain polymers of the formula $(NPCL_2)_n$, a process first demonstrated by Schmitz-DuMont (ref. 196) and illustrated in U.S. Pat. No. 3,370,020 to Allcock. Polymers formed in this matter have many desirable characteristics, including low temperature flexibility, thermal stability, resistance to hydrolysis in corrosive atmospheres and very low flammability. Unfortunately, the production of polyphosphazene polymers by this route has been found to be expensive and the final product characteristics are not easily controlled.

Improved processes for polyphosphazene synthesis include the use of solvents such as isopropyl alcohol as described in U.S. Pat. No. 3,459,838 to Klender and U.K. Pat. No. 1,497,264 to Hudson et al.

Another improvement is the use of acid acceptor substances, primarily amines, and particularly pyridine which not only reacts with the liberated acid but may serve as a catalyst as well. The use of acid acceptors is described in the following representative patents: U.S. Pat. No. 3,468,981 to Bezman, U.S. Pat. No. 3,524,907 to Stockel et al., and U.S. Pat. No. 3,974,242 to Linear.

Lewis acid catalysts have also been described as being effective, as evidenced by U.S. Pat. No. 4,005,171 to Reynard et al. and U.S. Pat. No. 4,116,891 to Dieck. Organo-metallic catalysts have also been reported and are discussed in the Dieck et al. patent supra. and U.S. Pat. No. 4,123,503 to Snyder et al.

It has been reported that for the polymerization of hexachlorocyclotriphosphazene, at least a trace amount of water must be present (U.S. Pat. No. 3,937,790 to Allcock et al.) although greater amounts hinder the reaction and the presence of water may be required for the polymerization of other halogenated cyclic phosphazenes.

Organo-metallic compounds containing boron with at least one halogen substituent have been reported to be effective as a polymerization catalyst by Snyder in U.S. Pat. No. 4,123,503 and Fieldhouse and Graves in *Phosphorus Chemistry*, American Chemical Society, Washington, D.C. 1981. Such compounds have been reported to be particularly effective in reducing the time of completion of the polymerization process with higher yields than those reported by other processes. There exists however a need for better catalysts allowing both control of the percent conversion and degree of cross-linking, the formation of structures which can be further modified by curing and other post polymerization reactions, and which can be used conveniently in solvents so as to eliminate the necessity found in some systems for removing gas from the reaction mixture under vacuum.

SUMMARY OF THE INVENTION

The invention described herein is a new composition of matter formed by the reaction of boron trihalides with compounds of the emperical formula $NHP_2O_2X_4$, wherein X is a halide to form products of the emperical formula $BNP_2O_2X_6$, wherein X is a halogen. Compounds of this invention have been found to be superior polymerization catalysts in the polymerization of halophosphazene trimers and other oligomers.

DETAILED DESCRIPTION OF THE INVENTION

The present invention relates to a novel composition of matter represented by the molecular formula:

   (Formula I)

wherein X is selected from the group consisting of F, Cl, Br or I or mixtures thereof. These compounds represented by Formula I are particularly effective as catalysts for the polymerization of polyphosphazene synthetic rubbers.

The catalysts of this invention are readily formed by reacting a boron trihalide with a compound of the structure:

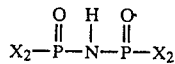

wherein X is any halide selected from the group consisting of: Cl, Br, F or I. While it is not necessary that all X in the above formulation be the same halide, the material is most readily synthesized by the reaction of ammonium sulphate with a phosphorus pentahalide followed by reaction of that intermediate with formic acid. For reasons of cost, and because the properties of the chlorinated polyphosphazenes are both well known and particularly advantageous in terms of chemical stability of the product rubber in the preferred embodiment, the halide used is chlorine.

The product of the above-described reaction sequence has the emperical formula $BNP_2O_2X_6$ wherein X is defined above and is believed to be represented by the structural formula:

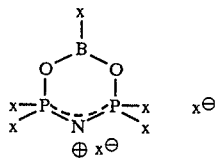

The nuclear magnetic resonance spectrum obtained using the phosphorus-31 isotope shows a single shift for phosphorus, indicating that the two positions are equivalent and that the structural formula is but one resonance form. The compounds are formed as polymers, which is typical of borates and their derivatives. The compounds are insoluble in chloroform and readily crystallize by slurrying in chloroformpentane mixtures.

Cyclic halopolyphosphazenes or other substituted oligomeric phosphozenes which may be catalyzed by the catalysts of the instant invention polymerize slowly when heated above approximately 250° C. The mechanism of the polymerization has been extensively studied and appears to be ionic, as demonstrated by the lack of increase in rate or yield in the presence of t-butyl peroxide and in the absence of an election spin resonance (e.s.r.) signal during polymerization at 250° C. The first step in the polymerization process is the loss of halide ion from $N_3P_3X_6$, wherein X is defined above, in the formation of an $N_3P_3X_5$ cation which is then available to attack other trimer molecules apparently with ring opening, to yield a linear cation which continues to increase in chain length by further attack on the cyclic trimers. The mechanism apparently involves electrophillic attack by phosphorus on a ring nitrogen with a subsequent loss of additional chloride ion. The termination step involves the reaction of a cation with available chloride anion. The thermal polymerization reaction never achieves 100 percent conversion and the system apparently involves an equilibrium between chain propagation and a depolymerization step in which the terminal phosphorus cation attacks an internal nitrogen resulting in the formation of a new cyclic trimer. At higher temperatures, an alternative mechanism is available wherein the more flexible linear polymers reform the trimer by internal ring formation and annealing.

An effective catalyst for cyclophosphazene polymerization would be one which allows the polymerization to occur at a lower temperature, thereby minimizing the looping off which occurs at higher temperatures. The catalyst must effectively remove a chloride anion to prevent chain termination or otherwise block the active cationic side from attack by the chloride. It is also advantageous to use a catalyst which is at least partically soluble in both the trimer and linear polymer, as well as in any solvent which may be employed for the reaction.

The selection of an effective catalyst is limited by the instability of the high polyphosphazene polymers with respect to hydrolysis. For this reason, Bronsted acids must be avoided, and water must be eliminated in excess of that amount required as described in Allcock et al. in U.S. Pat. No. 3,937,790.

The catalysts of this invention are derivatives of boron trihalides which also contain phosphorusnitrogen bonds characteristic of phosphazenes. These catalysts are thermally stable and are catalytically effective in amounts or concentrations ranging from 0.1 to 20 mole percent per parts by weight of phosphazene trimer or other cyclic monomer, preferably 0.5 to 10.0 mole percent, most preferably 1.0 to 5.0 mole percent.

The catalysts of this invention may be added directly to hexahalocyclotriphosphazene, or the catalyst and trimer may be dissolved in an aprotic solvent. In the preferred embodiment, hexachlorocyclotriphosphazene trimer and catalyst are charged into a glass-lined vessel in a catalyst to trimer mole ratio of from 1:60 to 1:10, preferably, 1:15 to 1:30. Heating the reaction mix in vacuo at a temperature between 170° and 250°, preferably 225° to 240°, for a time which varies inversely with the increasing temperature from 20 to 2 hours, yields a product which displays 95 to 100% conversion to polymer. An effect of lower trimer to catalyst ratios is found in the degree of cross-linking of the polymers formed and not in the conversion efficiency or average molecular weight.

The chloride and bromide derivatized catalysts of this invention were found to be more active in catalyzing the polymerization of hexachlorocyclotriphosphazene than was the fluoride derivative. The iodide derivative is less preferred because it must be prepared from $BI_3$, which is explosive on contact with water. The iodide derivatized catalysts are preferred embodiments only when the polymeric phosphazene must be a high purity product containing only those particular substituents.

The practice of this invention is illustrated by the following examples, which are not intended to limit the invention in any way. The utility of the invention as applied to other polymeric systems will be obvious to those skilled in the art.

EXAMPLE I

Synthesis of $BNP_2O_2CL_6$

Ammonium sulphate (58.5 grams, 0.5 mol) was slurried with a minimum amount of carbon disulphide (150 ml) in a 500 ml flask fitted with an overhead stirrer and an excess phosphorus pentachloride was introduced by a capillary tube below the surface of the liquid. After one-half hour at room temperature, the flask was heated in a water bath to 50° and the solvent and excess gas withdrawn under a partial vacuum. Stirring was stopped and the temperature of the water bath lowered to approximately 20° C. Dry formic acid (23 grams) was introduced into the flask and the flask was shaken for one-half hour. The stirrer was reattached and activated and 200 ml of chloroform was introduced into the flask. Excess boron trichloride gas was then bubbled through the reaction mixture for approximately 20 minutes. Stirring was continued for an additional 10 minutes, at which time an amber solid precipitate could be seen. Pentane (100 ml) was added to the solution and the precipitate was filtered and washed with a 50:50 mixture of chloroform and pentane. Product was then dried in vacuo. The resulting product $BNP_2O_2Cl_6$ (96% yield) is an amber polymeric solid. All procedures were carried out in an inert atmospheric box.

EXAMPLE II

Polymerization of Hexachlorocyclotriphosphazene

Hexachlorocyclotriphosphazene trimer was purified by sublimation at 140° and a vacuum of 20 to 30 millimeters Hg. The trimer (30 grams) and $BNP_2O_2Cl_6$ catalyst (1.5 grams) were introduced into a pyrex test tube which had previously been washed with aqueous caustic and dried for 24 hours at 350° and the tube was sealed under vacuum. The mixture in the tube was placed in an oven at 250° C. for 3 hours. The recovered product was a linear polyphosphazene polymer. All procedures were carried out in an inert atmospheric box.

I claim:

1. A compound described by the molecular formula: $BNP_2O_2X_6$, wherein X is selected from the group consisting of F, Cl, Br, I and mixtures thereof.

2. A cyclic, catalytically active compound as defined in claim 1 of the structure:

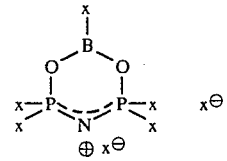

wherein X is selected from the class consisting of F, Cl, Br, I and mixtures thereof.

3. The compound as defined in claim 1 having the molecular formula $BNP_2O_2Cl_6$.

4. The compound as defined in claim 1 having the molecular formula $BNP_2O_2F_6$.

5. The compound as defined in claim 1 having the molecular formula $BNP_2O_2Br_6$.

6. A process for the manufacture of catalytically active compounds which comprises reacting in a halogenated solvent a compound of the formula $X_2P(O)NHP(O)X_2$ with a compound of the formula $BX_3$, wherein X is selected from the class consisting of F, Cl, Br, I and mixtures thereof.

7. A process for the polymerization of halophosphazene trimers which comprises reacting a halophosphazene trimer in the presence of a catalytically effective amount of a catalyst represented by the formula $BNP_2O_2X_6$, wherein X is selected from the class consisting of F, Cl, Br, I and mixtures thereof.

8. A process as defined in claim 7 wherein the catalyst is $BNP_2O_2Cl_6$.

* * * * *